(12) United States Patent
Stephens et al.

(10) Patent No.: US 7,645,902 B2
(45) Date of Patent: Jan. 12, 2010

(54) ACID-CATALYZED DEHYDROGENATION OF AMINE-BORANES

(75) Inventors: Frances Helen Stephens, Santa Fe, NM (US); Ralph Thomas Baker, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 614 days.

(21) Appl. No.: 11/473,510

(22) Filed: Jun. 22, 2006

(65) Prior Publication Data

US 2006/0292068 A1 Dec. 28, 2006

Related U.S. Application Data

(60) Provisional application No. 60/693,817, filed on Jun. 23, 2005.

(51) Int. Cl.
*C07F 5/02* (2006.01)
(52) U.S. Cl. .......................... 564/9; 423/297; 423/284; 423/285; 564/10; 564/11; 48/81
(58) Field of Classification Search .................... 564/9, 564/10, 11; 423/297, 284, 285; 48/61
See application file for complete search history.

(56) References Cited

U.S. PATENT DOCUMENTS

| 4,157,927 A | 6/1979 | Chew et al. |
| 4,315,786 A | 2/1982 | English et al. |
| 4,468,263 A | 8/1984 | Artz et al. |

OTHER PUBLICATIONS

C.A.Jaska, K.T.Temple, A.J.Lough, I.Manners, Transition metal-catalysed formation of boron-nitrogen bonds: catalytic dehydrocoupling of amino-borane adducts to form aminoboranes and borazines, J.Am.Chem.Soc., 2003, 125, 9424-9434.*
Patwari, "Proton Affinities of Borane-Amines: Consequences on Dihydrogen Bonding," J. Phys. Chem. A, vol. 109, No. 10, 2005.

* cited by examiner

*Primary Examiner*—Peter G O'Sullivan
*Assistant Examiner*—Sudhakar Katakam
(74) *Attorney, Agent, or Firm*—Robert P. Santandrea; Juliet A. Jones

(57) ABSTRACT

A method of dehydrogenating an amine-borane using an acid-catalyzed reaction. The method generates hydrogen and produces a solid polymeric $[R^1R^2B-NR^3R^4]_n$ product. The method of dehydrogenating amine-boranes may be used to generate $H_2$ for portable power sources.

16 Claims, 3 Drawing Sheets

ACID-CATALYZED DEHYDROGENATION OF AMINE-BORANES

REFERENCE TO PRIOR APPLICATION

This application claims the benefit of U.S. Provisional Application No. 60/693,817, filed Jun. 23, 2005.

STATEMENT REGARDING FEDERAL RIGHTS

This invention was made with government support under Contract No. W-7405-ENG-36, awarded by the U.S. Department of Energy. The government has certain rights in the invention.

BACKGROUND OF INVENTION

The invention relates to amine-boranes. More particularly, the invention relates to a method of dehydrogenating amine-boranes. Even more particularly, the invention relates to a method of providing hydrogen for power generation sources, such as fuel cells.

Chemical hydrides for hydrogen storage are being explored as alternatives to high pressure tanks (gas or liquid), adsorbed hydrogen, and metal hydride fuels. Chemical hydrides have the potential to be packaged as non-pyrophoric, non-hazardous fuels for automotive applications. Hydrogen may then be generated from such hydrides under controlled conditions on-board and on demand. The spent fuel may then be regenerated either on-board or off-board.

Hydrogen storage materials should ideally have high hydrogen content and low molecular weight. Ammonia-borane ($H_3NBH_3$), having a molecular hydrogen storage capacity of 19.6 wt %, is therefore an attractive material for such applications. Because the molecule contains both hydridic and protic hydrogen atoms, solid ammonia-borane spontaneously loses $H_2$ at temperatures above about 90° C. Ultimately, $H_3NBH_3$ can be dehydrogenated completely, forming ceramic BN, but temperatures in excess of 500° C. are required. Thermal decomposition of ammonia-borane in dilute solution (i.e., 0.15 M) at 85° C. initially affords the cyclic oligomers cyclotriborazane ($B_3N_3H_{12}$) and borazine ($B_3N_3H_6$). It has been demonstrated that preparation of $B_3N_3H_6$ from $H_3NBH_3$ on a large scale can be achieved in high yield over 3 hours by simply heating a 1.1 M tetraglyme solution of ammonia-borane in the range from 140 to 160° C. while actively distilling the product molecules out of the reaction vessel. Isolated borazine can be thermally crosslinked at temperatures between 70° C. and 110° C. with concomitant $H_2$ evolution.

It is possible to obtain a large amount of hydrogen from $H_3NBH_3$, but low energy (i.e., minimal heat input to initiate reactions) to utilize this fuel are only just being developed. For example, $H_2$ has been liberated at room temperature from $H_3NBH_3$ and the related species dimethylamine-borane ($HMe_2NBH_3$) by addition of metal catalysts. For example, select Rh(I) species dehydrocouple $HMe_2NBH_3$ to form $H_2$, along with the cyclic dimer $[BH_2NMe_2]_2$ and acyclic aminoborane polymers.

The use of mesoporous scaffolds to template thermal $H_3NBH_3$ dehydrogenation has also been reported. No borazine was observed during this reaction, and the exclusive formation of linear polymers has been suggested. Such selectivity is important, since volatile products of dehydrogenation may negatively affect fuel cell catalysts used in series with a hydrogen storage material.

Currently, methods of dehydrogenating amine-boranes at low temperature require the use of expensive metal catalysts such as rhodium or ill-defined structure-catalysis relationships in the case of mesoporous scaffolds. Therefore, what is needed is a well-defined method of dehydrogenating amine-boranes at low temperatures without the use of metal catalysts.

SUMMARY OF INVENTION

The present invention meets these and other needs by providing a method of dehydrogenating an amine-borane using an acid-catalyzed reaction. The method generates between 0.5 and 2.5 equivalents of hydrogen at temperatures between about 0° C. and about 100° C. The boron-nitrogen-containing products include a solid polymeric $[R^1R^2B-NR^3R^4]_n$ product and soluble oligomers, wherein the ratio of these products is determined by the reaction temperature and the reaction concentration. The method of dehydrogenating amine-boranes may be used to generate $H_2$ for portable power sources, such as, but not limited to, fuel cells.

Accordingly, one aspect of the invention is to provide a method of dehydrogenating an amine-borane. The method comprises the steps of: providing at least one amine-borane having the formula $HR^1R^2B-NR^3R^4H$; providing an acid; and combining the acid and the at least one amine-borane to form a catalytic initiator, wherein the catalytic initiator reacts with more of the at least one amine-borane to release hydrogen and yield a polymeric $[R^1R^2B-NR^3R^4]_n$ product.

A second aspect of the invention is to provide a method of producing hydrogen for a fuel cell. The method comprises the steps of: providing at least one amine-borane having the formula $HR^1R^2B-NR^3R^4H$; providing an acid; and combining the acid and the at least one amine-borane to form a catalytic initiator, wherein the catalytic initiator reacts with more of the at least one amine-borane to release hydrogen and yield a polymeric $[R^1R^2B-NR^3R^4]_n$ product without releasing substantial amounts of fuel cell contaminants.

A third aspect of the invention is to provide a method of dehydrogenating an amine-borane, the method comprising the steps of: providing at least one amine-borane having the formula $HR^1R^2B-NR^3R^4H$; and cationically initiating dehydropolymerization of the amine-borane to release hydrogen.

These and other aspects, advantages, and salient features of the present invention will become apparent from the following detailed description, the accompanying drawings, and the appended claims.

DETAILED DESCRIPTION

Figure 1:
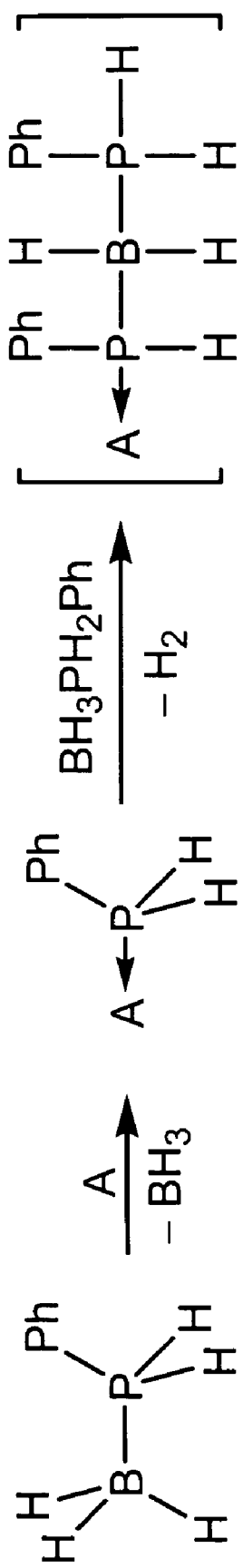
FIG. 1 is a prior-art mechanism of phosphine-borane dehydrocoupling.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the drawings in general and to FIG. 1 in particular, it will be understood that the illustrations are for the purpose of describing a particular embodiment of the invention and are not intended to limit the invention thereto. Dehydrocoupling of phosphine-boranes ($H_2RPBH_3$; where R=H or a phenyl (Ph) group), shown in FIG. 1, can be accelerated by the addition of the Lewis acid $B(C_6F_5)_3$. In the example shown in FIG. 1, the suggested mechanism of this transformation involves the reactive intermediate $H_2PhP \cdot B(C_6F_5)_3$ (where Ph=a phenyl group), which is formed by ligand exchange. This intermediate species forms because the B—P bond in phosphine-boranes is weak; $H_3PBH_3$ dissociates rapidly at temperatures above −30° C. The P—H bond of this intermediate is activated with respect to reaction with the hydridic B—H bond of $H_2PhPBH_3$, thus resulting in dehydrocoupling.

Figure 2:
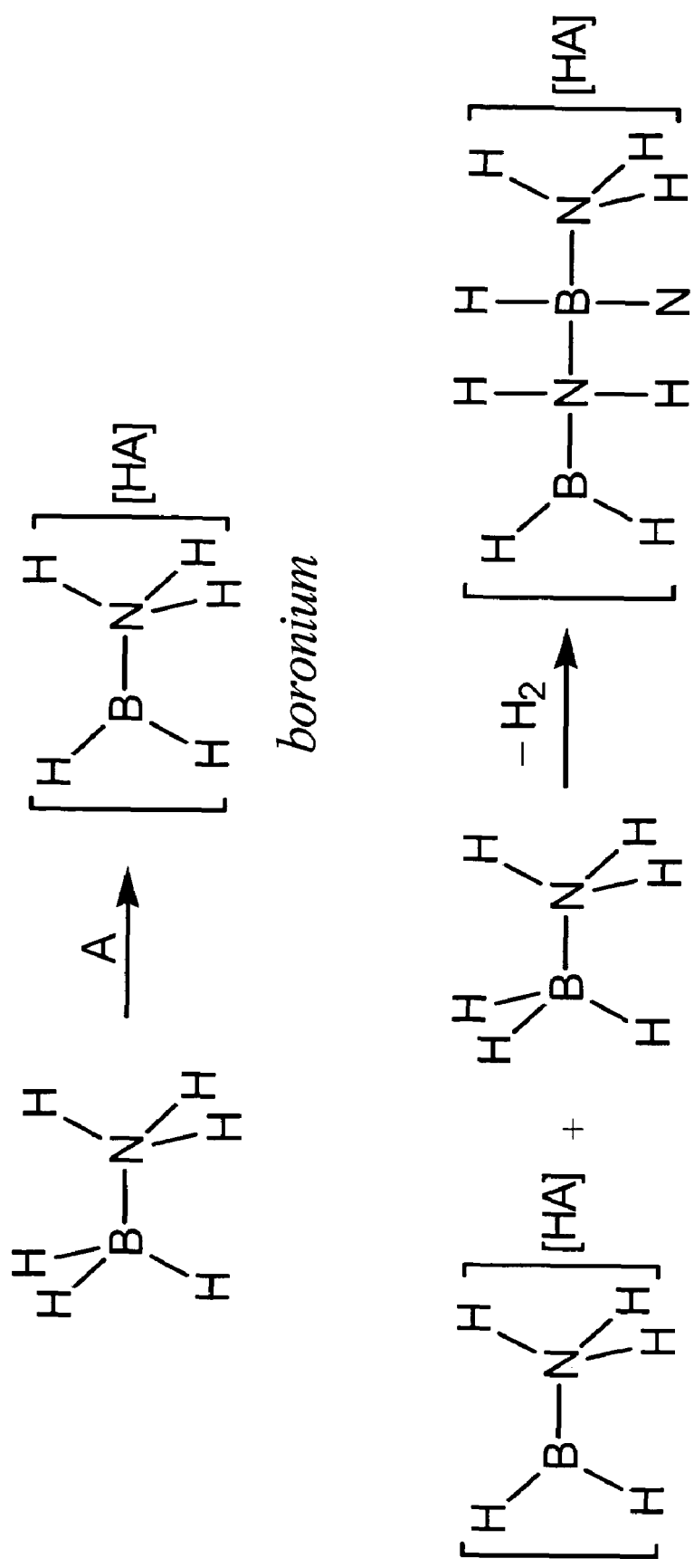
FIG. 2 is a mechanism of amine-borane dehydrocoupling initiated by acid A, where A is $B(C_6F_5)_3$.

The dehydropolymerization mechanism of the present invention, shown in FIG. 2, provides a method for the acid catalyzed evolution of hydrogen from an ammonia-borane via a distinctly different mechanism than that reported for phosphine-boranes. The dissociation mechanism reported for phosphine-boranes does not apply to reactions of $H_3NBH_3$, as there is no dissociation of the B—N bond below the decomposition temperature (about 90° C.). Instead, the Lewis acid abstracts hydride ion from boron to give boronium cation $[H_3NBH_2]^+$ (or the solvent-coordinated species, $[H_3NBH_2(solvent)]^+$, or the species where the anion is closely associated, $[H_3NBH_2(anion)]$), which then initiates the dehydrocoupling of $H_3NBH_3$.

Figure 3:
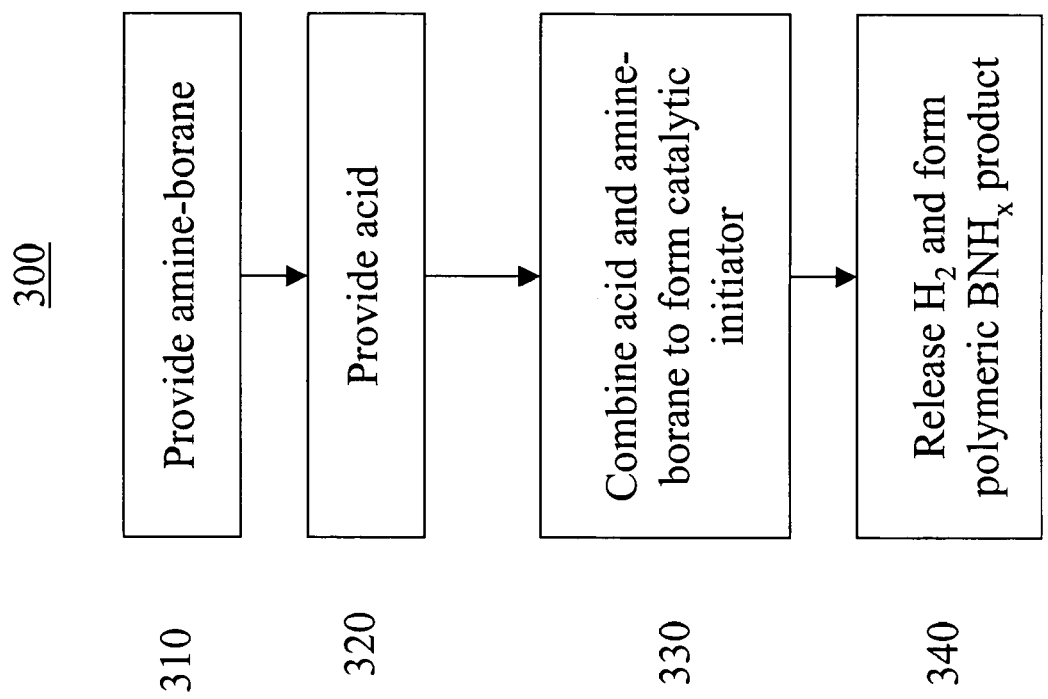
FIG. 3 is flow chart of a method of dehydrogenating an amine-borane, described herein.

A flow chart of a method 300, described herein, of dehydrogenating an amine-borane is shown in FIG. 3. In Step 310, at least one amine-borane having the general formula $HR^1R^2B—NR^3R^4H$ is provided. Each of the groups $R^1$, $R^2$, $R^3$, and $R^4$, independently and at each occurrence, is one of H, an alkyl group, or an aryl group. As described herein, "alkyl" is understood to mean an alkyl group having up to and including 12 carbons. Common examples of such alkyl groups include methyl, ethyl, propyl, isopropyl, butyl, s-butyl, isobutyl, pentyl, neopentyl, hexyl, heptyl, isoheptyl, 2-ethylhexyl, cyclohexyl, and octyl groups. Similarly, "aryl" is understood to mean a group defined as a monovalent radical formed conceptually by removal of a hydrogen atom from a hydrocarbon that is structurally composed entirely of one or more benzene rings. Common examples of such hydrocarbons include benzene, biphenyl, terphenyl, naphthalene, phenyl naphthalene, and naphthylbenzene.

In one embodiment, each of $R^1$, $R^2$, $R^3$, and $R^4$ are hydrogen; i.e., the amine-borane is ammonia-borane ($H_3NBH_3$). For applications requiring particularly high $H_2$ densities, such as hydrogen generation in transportation-based fuel cells, ammonia-borane is a preferred amine-borane, due to its high hydrogen density. The at least one amine-borane is typically dissolved or slurried in a polar, non-protic solvent. Non-limiting examples of such solvents include diethyl ether, dimethoxyethane, bis(2-methoxyethyl) ether, bis[2-(2-methoxyethoxy)ethyl]ether, and toluene. Alternatively, the amine-borane may be provided as a melt or a solid.

An acid is provided in Step 320. In one embodiment, the acid is either a Brønsted or Lewis acid. The Lewis acid may be one of a borane, such as, but not limited to tris(pentafluorophenyl)borane, trifluoroborane diethyl etherate, and triphenylborane; a trialkylaluminum compound, such as, but not limited to trimethylaluminum, triethylaluminum, and diisobutylaluminum; trityl species, such as, but not limited to, triphenylmethyl trifluromethanesulfonate, triphenylmethyl chloride, and triphenylmethyl tetrakis(3,5-bis(trifluoromethyl)phenyl)borate; and trimethylsilyl species, such as, but not limited to, trimethylsilyl trifluoromethanesulfonate and trimethylsilyl chloride. One particular non-limiting example of a Lewis acid is $B(C_6F_5)_3$. The Brønsted acid may be one of trifluoromethanesulfonic acid, a water adduct of tris(pentafluorophenyl)borane, water, mineral acids such as hydrochloric acid, oxonium borates (e.g., $[H(OEt_2)_2][B(C_6H_3-3,5-(CF_3)_2)_4]$) and trifluoroacetic acid. In each instance, the acid may be a liquid or in solution with the same solvent as that used to dissolve or slurry the at least one amine-borane. In another embodiment, the acid may be a supported acid, such as, for example, a polymer resin having at least one acid functionality. Alternatively, the acid may be provided as a solid or a melt.

The at least one amine-borane and the acid are combined in Step 330 to form an in situ catalytic initiator. The catalytic initiator reacts with more amine-borane to release hydrogen and yield a polymeric product. In one embodiment, the combined acid and the at least one amine-borane are heated to a temperature in a range from about 0° C. to about 100° C.

The reaction conditions, including temperature, concentration, and catalyst loading, can be varied during Step 330. When the temperature is raised, the reaction rate increases and the extent of the dehydrocoupling reaction is greater (i.e., more $H_2$ is released). When the concentration of the reactants is increased, the reaction rate increases. When the catalyst loading is decreased, the extent of the dehydrocoupling reaction is greater (i.e., more $H_2$ is released).

When either $R_1=R_3=H$ or $R_2=R_4=H$, further dehydrogenation of the polymeric $[R^1R^2B—NR^3R^4]_n$ product may be achieved by either heating the product in a range from about 25° C. to about 200° C., or adding a metal catalyst such as, but not limited to, rhodium to the product. In each case, $H_2$ is extracted to yield $[R_1B—NR_3]_n$ or $[R_2B—NR_4]$. When $R_1=R_2=R_3=R_4=H$, additional hydrogen may then be extracted by further reaction, yielding $BNH_x$. In either case, the residue may be used to regenerate amine-borane.

The following example illustrates the features and advantages of the invention and is not intended to limit the invention thereto.

EXAMPLE 1

In a typical reaction, 0.1 mmol of an amine-borane, such as, for example, ammonia-borane ($H_3NBH_3$) or an alkyl-substituted variant isobutylamine-borane ($^iBuH_2NBH_3$) was dissolved in approximately 0.5 mL dimethoxyethane or toluene, forming a 0.2 M solution. A solution of 0.1 equivalent acid was added to the amine-borane solution. The reaction mixture was then heated at 80° C. for 24 hours. After this time, all of the ammonia-borane had been consumed and both soluble and insoluble products had formed. The soluble products include borazine and cyclotriborazane.

For comparison purposes, an uncatalyzed thermolysis study was conducted in which a dimethoxyethane solution of ammonia-borane (0.2 M) was monitored at 80° C. over 24 hours using $^{11}B$ NMR. After 2 hours, a small amount of cyclotriborazane was observed in addition to unreacted ammonia-borane. The cyclotriborazane subsequently lost hydrogen slowly to form borazine ($B_3N_3H_6$). After 24 hours a significant amount (about 50%) of the starting material remained in the uncatalyzed reaction, indicating inefficient release of $H_2$.

In contrast to the uncatalyzed thermolysis, the addition of 10 mol % of the Lewis acid $B(C_6F_5)_3$ to $H_3NBH_3$ resulted in complete consumption of the starting material after the same time period and heating regimen. The product mixture included small amounts of the soluble products borazine and cyclotriborazane, and a significant amount of insoluble colorless solid, the latter being characteristic of polymeric aminoboranes. In addition to borazine and cyclotriborazane, all $^{11}$B NMR spectra of the reactions of $H_3NBH_3$ with $B(C_6F_5)_3$ display a doublet at δ −25 ppm, which is attributable to the anion $[HB(C_6F_5)_3]^-$. The strong Lewis acidity of $B(C_6F_5)_3$ is widely utilized to effect hydride and alkyl abstractions from a variety of substrates.

In the mechanism described herein, valid for all acids employed, hydride abstraction from $H_3NBH_3$ results in the formation of a boronium cation intermediate (FIG. 2). The boronium cation may be a three-coordinate boron $([H_3NBH_2]^+)$ or a four-coordinate boron $([H_3NBH_2(solvent)]^+$ or $[H_3NBH_2(anion)])$ This species interacts with an additional equivalent of ammonia-borane, resulting in proper alignment of the N—H bonds of the boronium cation and the B—H bonds of additional substrate. The dehydrogenation reaction proceeds with release of $H_2$ and propagation of the boronium cation.

EXAMPLE 2

When 10 mmol ammonia-borane is dissolved in 1 mL dimethoxyethane to form a 10 M solution and between 1 mol % and 0.5 mol % $B(C_6F_5)_3$ is added, the reaction proceeds much more quickly than in the 0.2 M solution. In addition to some white precipitate $([H_2B—NH_2]_n)$, borazine is observed as a major product. Therefore when a concentrated solution (>5 M) is used, more extensive dehydrogenation is achieved with evolution of between 1 and 2 equivalents of $H_2$.

EXAMPLE 3

When a dilute (<1 M) solution, such as that described in Example 1, is used with >5 mol % $B(C_6F_5)_3$, but the reaction is not heated above 40° C., the product distribution also differs. In this case, almost no borazine is formed. Therefore, lower reaction temperatures suppress formation of borazine.

EXAMPLE 4

Brønsted acids also react with $H_3NBH_3$ under mild conditions to yield hydrogen. In this case $H^+$ protonates the B—H bond, resulting in immediate loss of molecular hydrogen and formation of the boronium cation intermediate. For example, when 0.1 equivalent triflic (trifluoromethanesulfonic) acid was added to $H_3NBH_3$ at 22° C., immediate and copious bubbling ensued. The same concentration and temperature effects on product distribution that were observed for Lewis acids were also observed for Brønsted acids.

EXAMPLE 5

The boronium cation can be independently synthesized by addition of an amine-borane to an acid in a suitable solvent. This cation can be categorized as a Lewis acid, and also initiates evolution of $H_2$. The same concentration and temperature effects on product distribution that were observed for the Lewis acids discussed previously were also observed for the independently-synthesized boronium cation.

As previously mentioned, the dehydropolymerization of phosphine-boranes proceeds via a $H_2RP\cdot B(C_6F_5)_3$ intermediate. This species forms because the B—P bond in $H_2RPBH_3$ is weak; $H_3PBH_3$ dissociates rapidly at temperatures above −30° C. This mechanism does not apply to reactions of $H_3NBH_3$ because there is no dissociation of the B—N bond near room temperature. Thus, whereas the P—H bond of $H_2RPBH_3$ is activated by coordination of $B(C_6F_5)_3$, boronium cation formation via hydride abstraction activates the N—H bond in $H_3NBH_3$.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of dehydrogenating an amine-borane, the method comprising the steps of:
    a) providing at least one amine-borane, wherein the amine-borane has the formula $HR^1R^2B—NR^3R^4H$;
    b) providing an acid; and
    c) combining the acid and the at least one amine-borane to form a catalytic initiator, wherein the catalytic initiator reacts with more of the at least one amine-borane to release hydrogen and yield a polymeric $[R^1R^2B—NR^3R^4]$ product, and wherein each of $R^1$, $R^2$, $R^3$, and $R^4$, independently and at each occurrence, is one of hydrogen, an alkyl group, and an aryl group.

2. The method according to claim 1, wherein the step of combining the acid and the at least one amine-borane to form a catalytic initiator comprises:
    a) combining the acid and the at least one amine-borane; and
    b) heating the combined acid and the at least one amine-borane to a temperature in a range from about 0° C. to about 100° C.

3. The method according to claim 1, wherein the acid is a Lewis acid.

4. The method according to claim 3, wherein the Lewis acid is one of one of a borane, a trialkylaluminum compound, a trityl species, and a trimethylsilyl species.

5. The method according to claim 1, wherein the acid is a Brønsted acid.

6. The method according to claim 5, wherein the Brønsted acid is one of trifluoromethanesulfonic acid, a water adduct of tris(pentafluorophenyl)borane, water, a mineral acid, an oxonium borate, and trifluoroacetic acid.

7. The method according to claim 1 wherein each of $R^1$, $R^2$, $R^3$, and $R^4$, independently and at each occurrence, is hydrogen.

8. The method according to claim 1, further including the step of reacting the polymeric $[R^1R^2B—NR^3R^4]$ product with a metal catalyst to release hydrogen.

9. The method according to claim 1, further including the step of heating the polymeric $[R^1R^2B—NR^3R^4]$ product to a predetermined temperature to release hydrogen.

10. The method according to claim 9, wherein the predetermined temperature is in a range from about 25° C. to about 200° C.

11. A method of producing hydrogen for a fuel cell, the method comprising the steps of: providing at least one amine-borane, wherein the amine-borane has the formula $HR^1R^2B—NR^3R^4H$;
    a) providing an acid; and
    b) combining the acid and the at least one amine-borane to form a catalytic initiator, wherein the catalytic initiator reacts with more of the at least one amine-borane to release hydrogen and yield a polymeric $[R^1R^2B—NR^3R^4]$ product without releasing substantial amounts of fuel cell contaminants, and wherein each of $R^1$, $R^2$, $R^3$, and $R^4$, independently and at each occurrence, is one of hydrogen, an alkyl group, and an aryl group.

12. The method according to claim 11, wherein the acid is a Lewis acid.

13. The method according to claim 12, wherein the Lewis acid is one of a borane, a trialkylaluminum compound, a trityl species, and a trimethylsilyl species.

14. The method according to claim 11, wherein the acid is a Brønsted acid.

15. The method according to claim 12, wherein the Brønsted acid is one of trifluoromethanesulfonic acid, a water adduct of tris(pentafluorophenyl)borane, water, a mineral acid, and trifluoroacetic acid.

16. The method according to claim 11, wherein each of $R^1$, $R^2$, $R^3$ and $R^4$, independently and at each occurrence, is hydrogen.

* * * * *